United States Patent [19]
Lee

[11] Patent Number: 4,844,393
[45] Date of Patent: Jul. 4, 1989

[54] MULTI-PURPOSE STAND

[76] Inventor: Yu Lee, 3Fl.-1, No. 56, Sec. 4, Nanking E. Rd., Taipei, Taiwan

[21] Appl. No.: 212,190

[22] Filed: Jun. 27, 1988

[51] Int. Cl.$^4$ ............................................. F16M 11/32
[52] U.S. Cl. .................................... 248/165; 211/134; 211/187; 248/161; 248/176
[58] Field of Search ............... 248/125, 129, 132, 161, 248/165, 157, 176; 211/186, 187, 205, 134, 194

[56] References Cited

U.S. PATENT DOCUMENTS

| | | | |
|---|---|---|---|
| 652,170 | 6/1900 | Dibble | 248/125 |
| 3,317,168 | 5/1967 | Ziph | 248/125 X |
| 3,533,583 | 10/1970 | Azim | 248/132 X |
| 4,628,553 | 12/1986 | Buttitta et al. | 248/161 X |
| 4,725,027 | 2/1988 | Bekanich | 248/129 X |
| 4,763,799 | 8/1988 | Cohn et al. | 211/187 |

Primary Examiner—Ramon O. Ramirez
Attorney, Agent, or Firm—Bernard R. Gans

[57] ABSTRACT

A multi-purpose stand having a rack, a plurality of plates and a base. The rack has a plurality of tubular elements of different dimensions, each of which is attached to each other by pins penetrating holes provided on the corresponding tubular elements. A bottom frame is mounted on the lower one of the tubular elements for vertically maintaining the rack. Two plates have a pair of hinging hooks on an exterior side. A retaining member is secured on one of the tubular elements and has a pair of hinging holes provided on the retaining member for engaging with the hinging hooks. A pair of securing means are mounted on a rod which is mounted on the retaining member and cover the hinging hooks so as to prevent the hinging hooks from disengaging. A pair of supporting elements are received by a pair of slots formed on the lateral side of the retaining member to support the plate mounted on the retaining member. The base has a plurality of door-like members under each of which a case is installed by fixing means.

3 Claims, 8 Drawing Sheets

MULTI-PURPOSE STAND

BACKGROUND OF THE INVENTION

The present invention relates to a multi-purpose stand, and more particularly relates to such a stand which can be fabricated in various manners so as to meet different requirements.

Heretofore, various labor saving devices have been developed for making tasks more easy; such as, repairing automobiles, painting and cleaning walls or the like, displaying implements for gardeners, carpenters, masons and other workmen. Since it is inconvenient and impractical for a family to possess all these devices for different purpose, the present invention has arisen from work in seeking to develop such a device.

SUMMARY OF THE INVENTION

A primary objective of the present invention is to provide a multi-purpose stand which can be fabricated in different manners to meet different requirements.

Another objective of the present invention is to provide a multi-purpose stand which is easily manufactured and assemblied.

Still another objective of the present invention is to provide a multi-purpose stand which has performance characteristics superior to any heretofore available.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
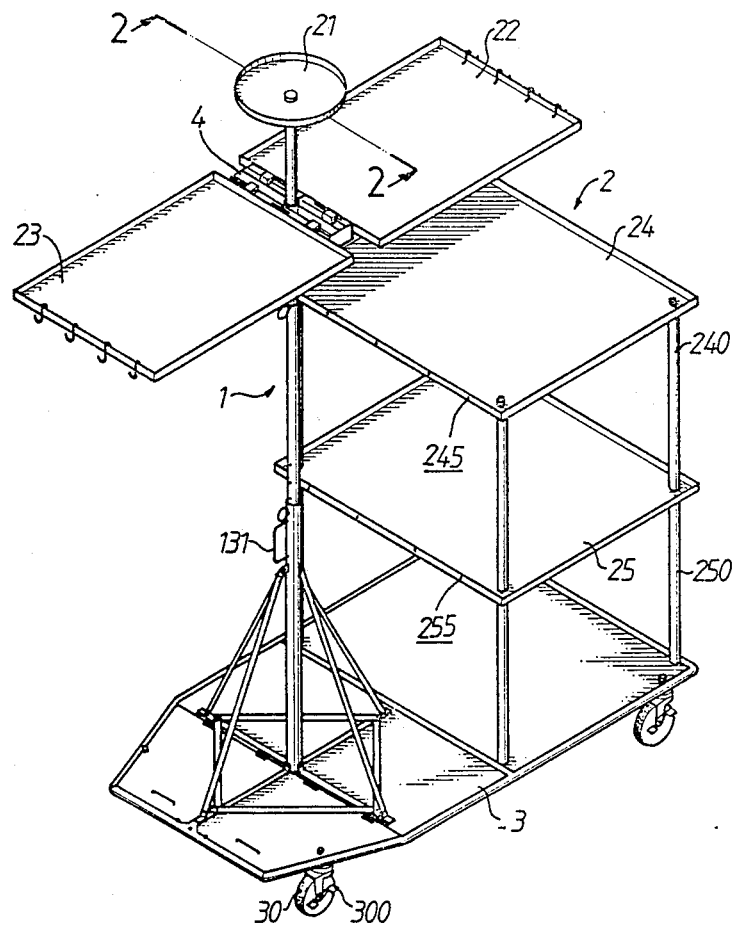
FIG. 1 is a perspective view of an embodiment of a multi-purpose stand in accordance with the present invention.

With reference to the drawings and particular to FIG. 1 thereof, it can be seen that one embodiment of a multi-purpose stand in accordance with the present invention comprises a rack 1, a plurality of plates 2 and a base 3, on the bottom of which a plurality of casters 30 with locking means 300 are provided so as to be turned and moved easily.

Figure 2:
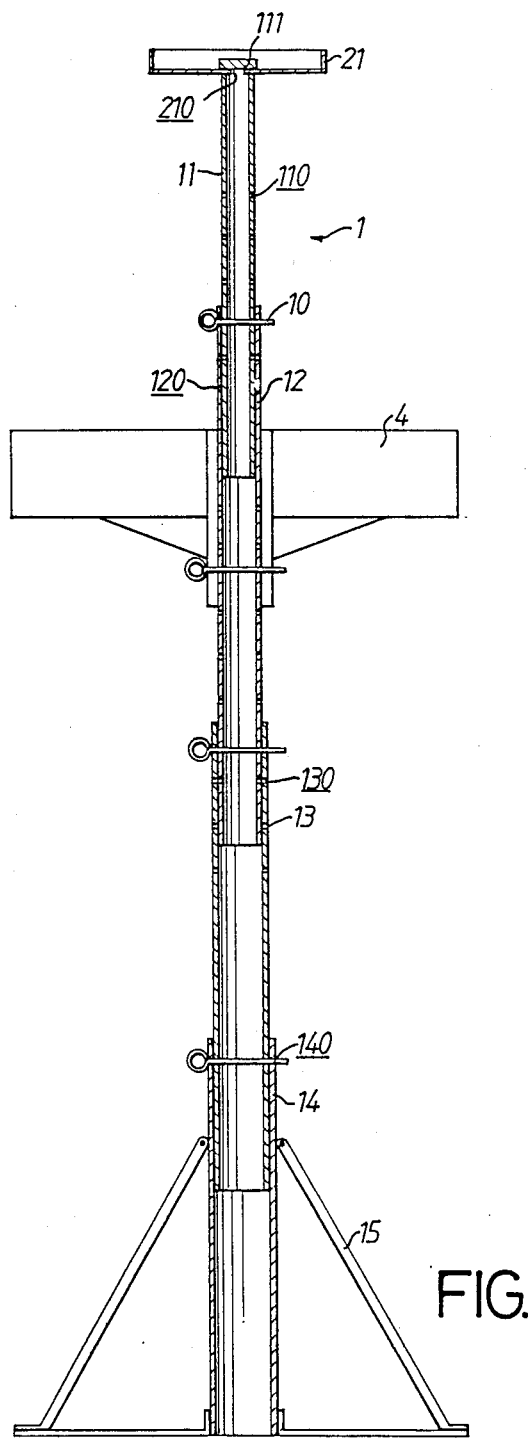
FIG. 2 is a cross-sectional view of a rack of the multi-purpose stand taken substantially on line 2—2 of FIG. 1.

As is common in the fabrication of conventional racks, shown in FIG. 2, the rack 1 of this invention comprises a plurality, here four, of tubular elements 11, 12, 13 and 14 of different dimensions. Each of he tubular elements has a plurality of holes provided along the length, which are numeral as 110, 120, 130 and 140 according to respective tubular elements. A first tubular element 11 is attached to a second tubular element 12 by a pin 10 penetrating the first and second tubular elements 11, 12 via holes 110, 120 likewise, the second, third and fourth tubular elements 12, 13 and 14 are attached to each other by other pins 10 in such a manner that the length of the rack 1 is adjustable by adjusting the relative distances between the tubular elements. Furthermore, a bottom frame 15 is mounted on the lowermost, here fourth tubular element for maintaining the rack 1 vertical, by either screwing to the base 3 or to the ground.

The first tubular element 11 has a threaded protruding end to receive a first plate 21 which is secured by a nut 111, and which allows the first plate 21 to be rotatable. Preferably, a handle 131 (not shown in FIG. 2, but in FIG. 1) is welded on one, here the fourth, tubular element for facilitating the easily moving of the rack 1.

Figure 3:
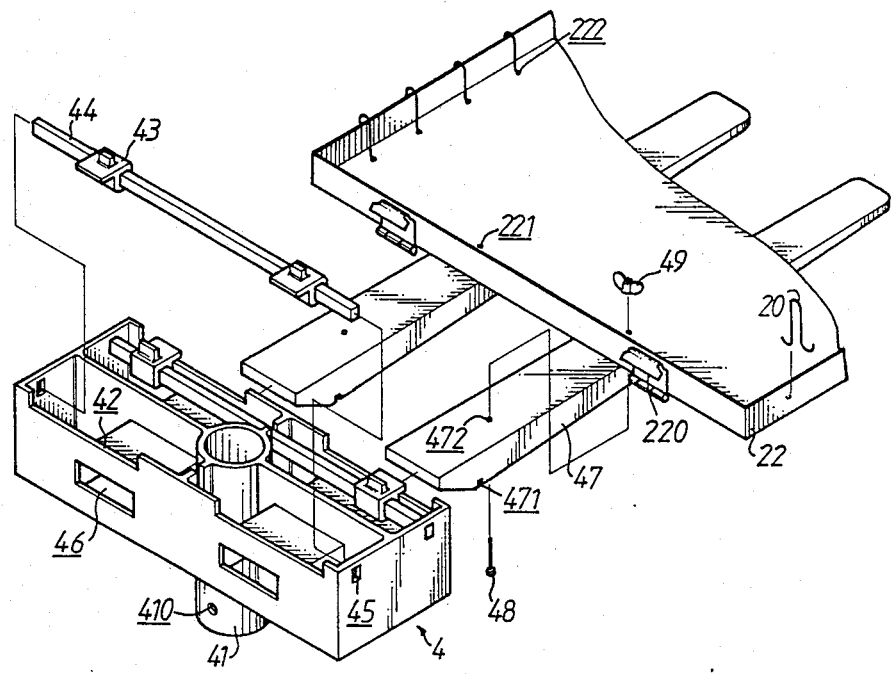
FIG. 3 is a partial exploded view of a retaining member of the multi-purpose stand of FIG. 1.

With reference to FIG. 3, a retaining member 4 comprises a sleeve 41, at the center portion, having a bore which is larger than the exterior diameter of the second tubular element 12, such that the retaining member 4 encompasses the second tubular element 12 and is secured thereon by a pin 10 (not shown in FIG. 3) inserted in the holes 120 of the tubular element 12 and openings 410 provided at the lower portion of the sleeve 41.

The second plate 22 has a pair of hinging hooks 220 mounted on one exterior side thereof to hinge on the lateral side of the retaining member 4. Furthermore, a plurality of openings 222 are provided on the bottom end adjacent to the other sides of the second plate 22 for suspending hooks 20. The third plate 23 provided on the retaining member 4 has a structure similar to the second plate 22 and is juxtaposed to the second plate 22.

Although not limited thereto, a pair of hinging holes 42 are provided along the upper edge of a lateral surface of the retaining member 4 for engaging with the hinging hooks 220 on the second plate 22. A pair of securing means 43 are mounted on a rod 44 and cover the hinging hooks 220 so as to prevent the hinging hooks 220 from disengaging. The manner in which the securing means 43 is mounted on the rod 44 is that the rod 44 is inserted through an aperture 45 provided on a lateral side of the retaining member 4 and receives the securing means 43 respectively lodged within the hinging holes 42, and, then, is inserted through another aperture 45.

It should be noted that the securing means 43 are slidable on the rod 44 within the hinging holes 42 and the clearance in the hinging holes 42 is large enough for the assembly/disassembly of the hinging hooks 220. Therefore, it is unnecessary to disassemble the securing means 43 from the rod 44 when the user mounts the second plate 22 on the retaining member 4.

Moreover, a pair of slots 46 are formed beneath the hinging holes 42 for respectively receiving a supporting element 47 to support the second plate 22. The supporting element 47 has a cut 471 on its bottom side to lock on the lower edge of the slot 46, and has a hole 472 on its upper surface. The second plate 22 has two holes positioned according to the lower holes 472 so that a bolt 48 combines the supporting elements 47 to the second plate 22 with the aid of a wingnut 49 via the lower and upper holes 472, 221. In a like manner, the third plate 23 is mounted on the retaining member 4 and combined to another pair of supporting elements 47.

Figure 4:
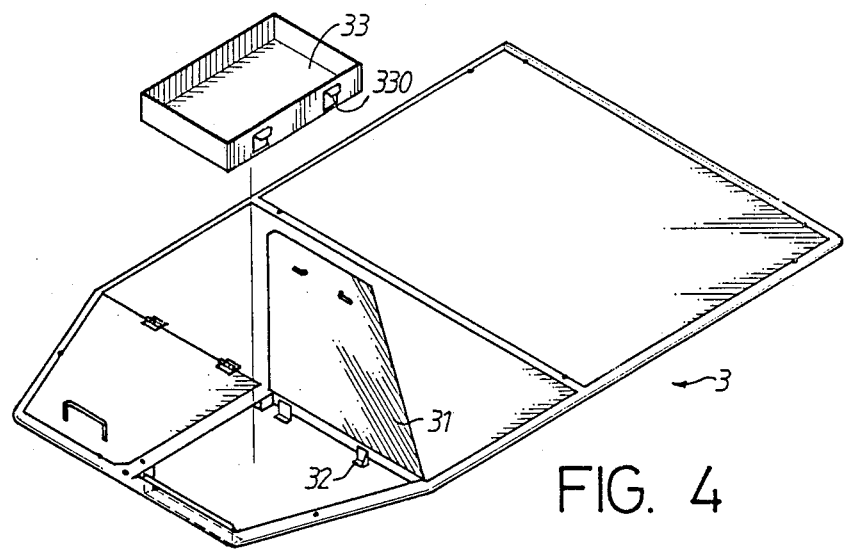
FIG. 4 is a partial exploded view of a base of the multi-purpose stand of FIG. 1.
Figure 5:
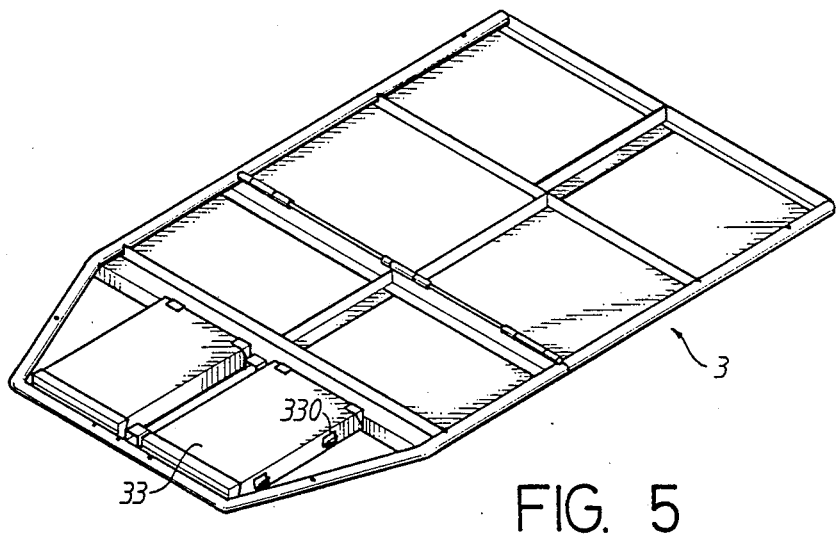
FIG. 5 is a bottom view of the base of FIG. 4.

Referring to FIG. 4, the base 3 has a plurality, here two, of door-like members 31, wherein a case 33 can be installed under each of the door-like members 31 by fixing means 32. The case 33 has a plurality of hooks 330 for attaching either on the plates 22, 23 or on the retaining member 4 in a manner like that of the plates 22, 23 attaching on the retaining member 4. Moreover, the base 3 is foldable so as to facilitate the storage of the base 3, since the base 3 is hinged on the central axis thereof, shown in FIG. 5.

Figure 6:
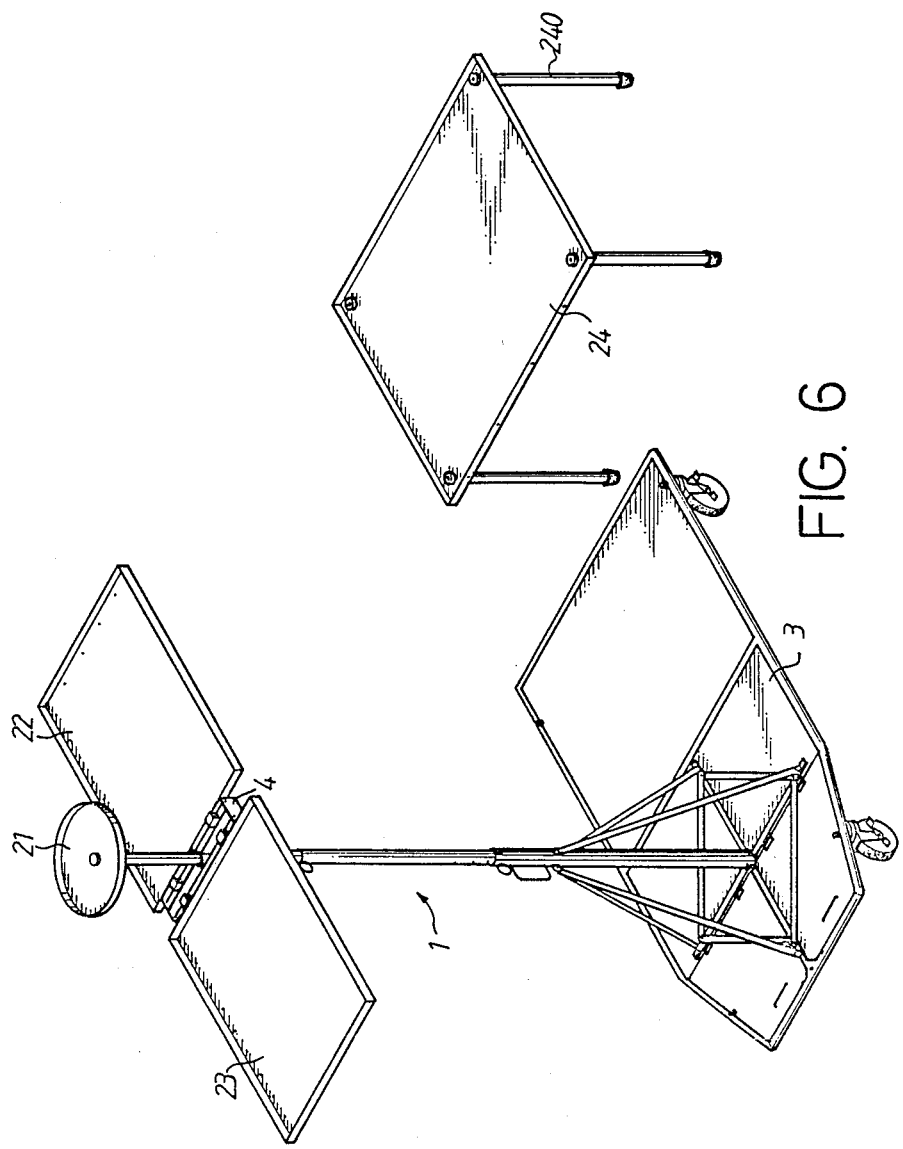
FIG. 6 is a perspective view of another embodiment of a multi-purpose stand.

As an example, but not intended to limit the scope of the invention, to the assembly of the embodiment of FIG. 1 is added fourth and fifth plates 24, 25 supported by a plurality of upper and lower tubular means 240 and 250. The fourth plate 24 is fixed on the fifth plate 25 by the upper tubular means 240 screwed on the lower tubular means 250 and the fifth plate is screwed on the base. As far as the fabrication of this invention is concerned, other embodiments, for example, are illustrated in FIGS. 6,7 and 8 to meet different requirements.

Figure 7:
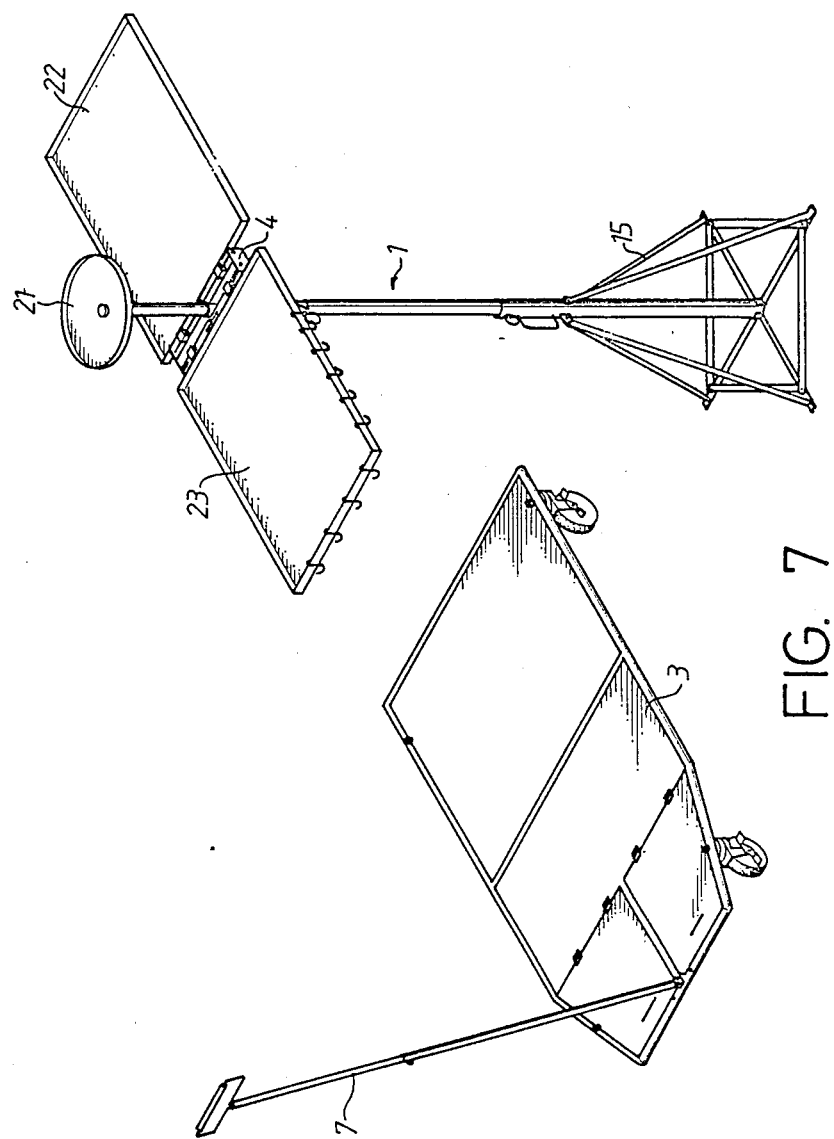
FIG. 7 is a perspective view of one embodiment of a multi-purpose stand.
Figure 8:
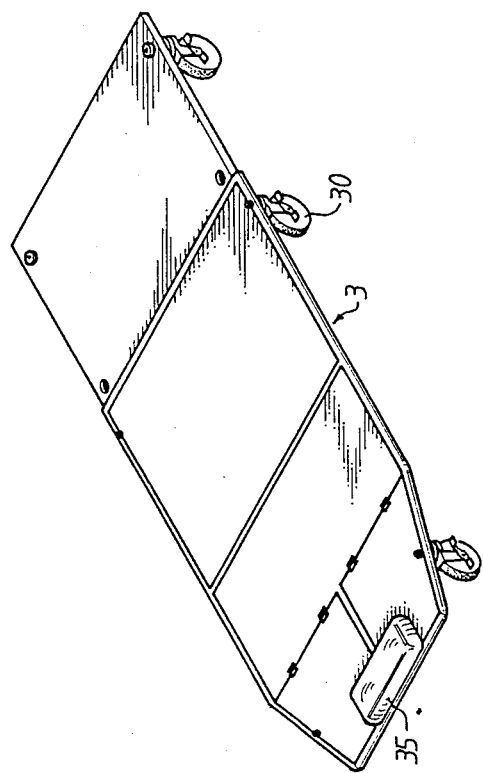
FIG. 8 is a perspective view of another embodiment of a multi-purpose stand.

Referring to FIG. 7, a pulling handle 7 is screwed on the base 3 to facilitate the movement of the base so as to employ this invention as a trolley and the rack 1 can be removed and set to display articles. Further referring to FIG. 8, the fourth or fifth plate 24, 25 with a plurality of casters provided therebelow is screwed on the base 3 via lateral holes 245, 255 (not shown in FIG. 7 but in FIG. 1) so as to extent the length of the base 3. A pillow 35 is secured on an end opposite to the plate 24, 25, so that this embodiment can be employed as a working bed or the like.

Figure 9:
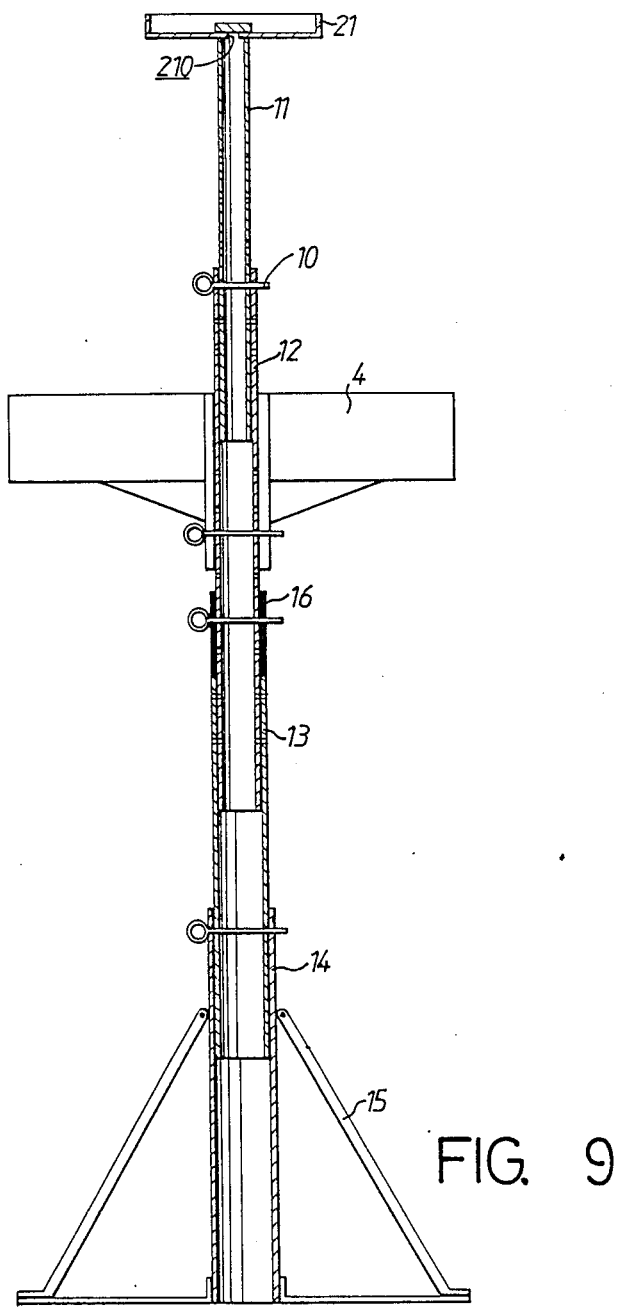
FIG. 9 is a cross-sectional view, similar to FIG. 2, of another embodiment.

Particularly, referring to FIG. 9, it can be seen that a fifth tubular element 16 is employed to enable the rotation of the second tubular element 12 on the third tubular element 13. The third and fifth tubular elements 13, 16 are of the same dimensions, and the second and fifth tubular element 12, 16 are secured together before the second tubular element 12 is encompassed by the third tubular element 13. Therefore, the plates mounted on the retaining member 4 are rotatable.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A multi-purpose stand comprising, in combination: a rack, a plurality of plates and a base, wherein
   (a) said rack has a plurality of tubular elements of different dimensions; each of said tubular elements has a plurality of holes provided along the length and is attached to each other by pins penetrating said holes provided on the corresponding tubular elements; and a bottom frame is mounted on a lowermost one of said tubular elements for vertically maintaining said rack;
   (b) a first plate has an aperture on a center portion thereof for receiving a threaded protruding end on a first tubular element and engaged thereon by a nut; second and third plates have a pair of hinging hooks on an exterior side thereof; fourth and fifth plates are supported by a plurality of tubular means;
   (c) a retaining member comprises a sleeve to encompass one of said tubular elements on which said retaining member is secured; a pair of hinging holes are provided along an upper edge of a lateral surface of said retaining member for engaging with said hinging hooks;
   (d) a pair of securing means are mounted on a rod which is provided on said retaining member and cover said hinging hooks so as to prevent said hinging hooks from disengaging;
   (e) a pair of supporting elements are received by a pair of slots formed beneath said hinging holes on a lateral side of said retaining member so as to support said plate mounted on said retaining member; a cut is formed on a bottom side of said retaining member to lock on a lower edge of said slot; and
   (f) said base has a plurality of casters with locking means so as to be turned and moved easily; said base has a plurality of door-like members under each of which a case is installed by fixing means; and said base is hinged on a central axis to be foldable so as to facilitate a storage of said base.

2. A multi-purpose stand as set forth in claim 1, wherein a fifth tubular element is employed to enable a rotation of a tubular element attached to and above said fifth tubular element by putting said fifth tubular element on another tubular element of the same dimension as said fifth tubular element.

3. A multi-puprose stand as set forth in claim 1, wherein a pulling handle is screwed on said base to facilitate a movement of said stand.

* * * * *